United States Patent [19]

Hick

[11] 3,959,554
[45] May 25, 1976

[54] AQUEOUS THERMOSETTING ACRYLIC ENAMEL FOR FINISHING FLEXIBLE HYDROCARBON RUBBER SUBSTRATES

[75] Inventor: Robert M. Hick, Springfield, Pa.

[73] Assignee: E. I. du Pont de Nemours and Co., Wilmington, Del.

[22] Filed: Mar. 10, 1975

[21] Appl. No.: 557,182

Related U.S. Application Data

[60] Division of Ser. No. 472,209, May 21, 1974, abandoned, which is a continuation-in-part of Ser. No. 319,897, Dec. 29, 1972, Pat. No. 3,841,895.

[52] U.S. Cl. .................... 428/336; 260/77.5 CR; 260/856; 428/332; 428/334; 428/423; 428/425
[51] Int. Cl.² .................... B32B 27/40; C08L 61/26
[58] Field of Search .......... 428/332, 492, 335, 336, 428/423, 425; 260/29.6 NR, 29.6 T, 77.5 CR, 856, 29.4 UA

[56] References Cited
UNITED STATES PATENTS

| | | | |
|---|---|---|---|
| 3,841,895 | 10/1974 | Hick | 260/29.6 NR |
| 3,862,071 | 1/1975 | DiCarlo | 260/856 |

*Primary Examiner*—William J. Van Balen
*Assistant Examiner*—P. J. Thibodeau

[57] ABSTRACT

The aqueous thermosetting acrylic enamel is used to finish flexible substrates that are used for automobile and truck bumpers, flexible filler panels located between the bumper and the chassis, flexible fender extensions, flexible exterior trim parts and other impact and energy absorbing parts; the enamel is an aqueous composition containing the following film-forming constituents:

A. an acrylic polymer of an alkyl methacrylate having 1–4 carbon atoms in the alkyl group or styrene or a mixture thereof, an alkyl methacrylate having 6–12 carbon atoms in the alkyl group or an alkyl acrylate having 2–12 carbon atoms in the alkyl group, a hydroxy alkyl acrylate or methacrylate or a mixture thereof; and an $\alpha,\beta$-ethylenically unsaturated dicarboxylic acid; and B. a heat reactive condensate such as an alkylated melamine formaldehyde resin;

wherein the film-forming constituents are neutralized with ammonia or an amine to a pH of about 7–10.

5 Claims, No Drawings

AQUEOUS THERMOSETTING ACRYLIC ENAMEL FOR FINISHING FLEXIBLE HYDROCARBON RUBBER SUBSTRATES

CROSS REFERENCE TO RELATED APPLICATIONS

This application is a divisional of Ser. No. 472,209, filed May 21, 1974, now abandoned which was a continuation-in-part of Ser. No. 319,897, filed Dec. 29, 1972, now U.S. Pat. No. 3,841,895.

BACKGROUND OF THE INVENTION

This invention is related to an aqueous enamel and in particular to an aqueous thermosetting acrylic enamel for finishing flexible substrates.

The automobile and truck manufacturing industry is currently utilizing bumpers of a flexible material, filler panels located between the bumper and the chassis, fender extensions, flexible exterior trim parts and other energy and impact absorbing parts to reduce damage in the event of a minor impact or a collision.

To provide the automobile or truck with a pleasing aesthetic appearance, a finish is applied to these parts. The parts are required to have a finish that has excellent adherence to the substrate, and is durable, flexible and weatherable. However, conventional hydrocarbon rubber substrates and other flexible substrates coated with enamels have been found unacceptable after short periods of use because of failure of the finish.

The novel aqueous thermosetting enamel of this invention provides finishes for hydrocarbon rubber substrates and other flexible substrates which have excellent properties.

SUMMARY OF THE INVENTION

An aqueous thermosetting acrylic enamel coating composition of this invention that is used to finish flexible substrates with about a 0.1 to 10 mil thick finish has a solids content of film-forming constituents of 5–50%; wherein the film-forming constituents consist essentially of A. 70–95% by weight of an acrylic polymer consisting essentially of
  1. 19–44% by weight, based on the weight of the acrylic polymer, of styrene or an alkyl methacrylate having 1–4 carbon atoms in the alkyl group or a mixture thereof;
  2. 50–75% by weight, based on the weight of the acrylic polymer, of an alkyl methacrylate having 6–12 carbon atoms in the alkyl group, or an alkyl acrylate having 2–12 carbon atoms in the alkyl group or a mixture of these constituents;
  3. 5 to 20% by weight, based on the weight of the acrylic polymer, of a hydroxy alkyl acrylate or methacrylate having 2–4 carbon atoms in the alkyl group or a mixture thereof; and
  4. 1 to 20% by weight, based on the weight of the acrylic polymer, of an $\alpha,\beta$-ethylenically unsaturated carboxylic acid;

B. 5–30% by weight, based on the weight of the film-forming constituents, of a compatible cross-linking agent which is an alkylated melamine formaldehyde resin having 1–8 carbon atoms in the alkyl group; wherein the film-forming constituents are neutralized with ammonia or an amine to a pH of about 7–10.

DESCRIPTION OF THE INVENTION

The novel coating composition of this invention has a solids content of film-forming constituents of about 5–50% and preferably, about 20–40% by weight. The novel composition can be clear or pigmented and if pigmented contains about 0.1–30% by weight pigment. Preferably, the pigmented compositions have a pigment to binder ratio of 5/100 to 40/100.

The film-forming constituents used in the coating composition comprise 70–95% by weight of an acrylic polymer, and correspondingly, 30–5% by weight of a compatible cross-linking agent, and preferably, about 85–90% by weight of the acrylic polymer and 10–15% by weight of the cross-linking agent. One preferred composition contains 87% by weight of the acrylic polymer and 13% by weight of an alkylated melamine formaldehyde resin.

The acrylic polymers utilized in the coating composition are prepared by conventional polymerization techniques in which the monomers are blended with solvents and polymerization catalysts and heated to about 75°–150°C. for about 2–6 hours to form a polymer that has a relative viscosity of about 1.05–1.30, and preferably, about 1.06–1.20.

The relative viscosity is the value obtained by dividing the efflux time of the solution of the polymer by the efflux time of the solvent used to form the above polymer solution. The efflux times are measured according to the procedure of ASTM-D-445-46-T, Method B, using as the polymer solution 0.5 gram of the polymer dissolved in methlethyl ketone to give 50 cubic centimeters of solution. The efflux is measured at a time temperature of 30°C. in a standard apparatus sold under the designation of modified Ostwald viscometer.

Typical solvents which are used to prepare the acrylic polymer and also used as diluent in the coating composition used in this invention are toluene, xylene, butyl acetate, ethyl acetate, acetone, methylethyl ketone, methylisobutyl ketone, ethyl alcohol, butyl alcohol and other aromatic hydrocarbons, cycloaliphatic hydrocarbons, esters ethers, ketones and alcohols, such as are conventionally used.

About 0.1–4% by weight, based on the weight of the monomers used to prepare the acrylic polymer, of a polymerizaton catalyst is used. Typical catalysts are azo-bis-isobutyronitrile, azo-bis-($\alpha$-gamma-dimethylvaleronitrile), benzoyl peroxide, t-butyl peroxy pivalate, di-tertbutyl peroxide and the like. Up to 5% by weight of a chain transfer agent can be used to control molecular weight such as dodecyl mercaptan or benzene thiol.

The acrylic polymer of the coating composition of this invention contains 19–44% by weight, based on the acrylic polymer, of an alkyl methacrylate that has 1–4 carbons in the alkyl group or styrene or a mixture of the alkyl methacrylate and styrene. Typical alkyl methacrylates which can be used are methyl methacrylate, ethyl methacrylate, propyl methacrylate, isopropyl methacrylate, butyl methacrylate, isobutyl methacrylate and the like. Preferably, the acrylic polymer contains 20 to 32% by weight of methyl methacrylate.

The acrylic polymer also contains 50–75% by weight, based on the weight of the acrylic polymer, of an alkyl methacrylate that has 6–12 carbon atoms in the alkyl group, or an alkyl acrylate that has 2–12 carbon atoms in the alkyl group or a mixture of the alkyl methacrylate and the alkyl acrylate. Typical alkyl methacrylates that can be used are hexyl methacrylate, 2-ethylhexyl methacrylate, octyl methacrylate, nonyl methacrylate, decyl methacrylate, and lauryl methacrylate. Typical alkyl acrylates that can be used are ethyl acrylate, propyl acrylate, butyl acrylate, isobutyl acrylate, hexyl acrylate, 2-ethylhexyl acrylate, octyl acrylate, nonyl acrylate, decyl acrylate, lauryl acrylate and the like. Preferably, the acrylic polymer contains 55 to 65% by weight of an alkyl acrylate having 2–8 carbon atoms in the alkyl group, preferably butyl acrylate.

The acrylic polymer contains 5–20% by weight, preferably 8–12% by weight of a hydroxy alkyl acrylate or a hydroxy alkyl methacrylate or a mixture thereof that has 2–4 carbon atoms in the alkyl groups. Typical compounds of this type are hydroxyethyl acrylate, hydroxypropyl acrylate, hydroxybutyl acrylate, hydroxyethyl methacrylate, hydroxypropyl methacrylate, hydroxybutyl methacrylate and the like. Hydroxyethyl acrylate is preferred.

The acrylic polymer contains 1–20% by weight of an α,β-ethylenically unsaturated carboxylic acid, and preferably 1–5% by weight of the acid. Typical acids are acrylic acid, methacrylic acid, itaconic acid, crotonic acid, ethacrylic acid, propyl acrylic acid, and the like. Preferred are methacrylic acid and acrylic acid.

The following is one preferred acrylic polymer:
20 to 32% by weight of methyl methacrylate,
55 to 65% by weight of butyl acrylate,
8 to 12% by weight of hydroxyethyl acrylate,
1 to 5% by weight of acrylic acid or methacrylic acid.

One particularly preferred polymer that gives a high quality finish is 61% butyl acrylate, 26% methyl methacrylate, 10% 2-hydroxyethyl acrylate and 3% acrylic acid.

A blend of hard and soft acrylic polymers can be used in the acrylic enamel.

The cross-linking agent of the coating composition used in this invention is compatible with the acrylic polymer and is water soluble or water dispersible and is an alkylated melamine formaldehyde resin. Typical alkylated melamine formaldehyde resins have 1–8 carbon atoms in the alkyl group and are resins that are well known in the art. These resins are prepared by conventional techniques in which a lower alkyl alcohol such as methanol, ethanol, butanol, isobutanol, propanol, isopropanol, hexanol, 2-ethyl hexanol and the like is reacted with a melamine formaldehyde to provide pendent alkoxy groups.

Preferred melamine resins that are used are butylated melamine formaldehyde resins, methylated/butylated melamine formaldehyde resins and hexa(methoxymethyl) melamine.

An acid catalyst can be used in the coating composition such as para-toluene sulfonic acid or butyl acid phosphate. An acid catalyst is needed if there is an absence of acid groups in the acrylic polymer or if a low temperature cure is required, or if a highly etherified melamine resin is used such as hexa(methoxymethyl)-melamine.

Organic plasticizers can also be used in the thermosetting acrylic coating composition of this invention in amounts up to 1–10% by weight based on the weight of film-forming constituents. Monomeric and polymeric plasticizers can be used such as phthalate ester plasticizers, and in particular, alkyl and cycloalkyl ester phthalates in which the alkyl groups have 2–10 carbon atoms such as dioctyl phthalate, didecyl phthalate, butyl benzylphthalate, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, neopentyl glycol adipate benzoate, ethylene glycol adipate benzoate phthalate, can also be used in the coating composition of this invention.

The coating composition used in this invention can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

Other compatible resins can be incorporated into the coating composition of this invention such as vinyl chloride copolymers, polyurethanes, cellulose acetate butyrate, and silicone resins. Also, ultraviolet light stabilizers can be incorporated into the coating composition.

The thermosetting acrylic coating composition is formed into a water based finish by neutralizing the polymer solution with ammonia or an amine such as diethylethanol amine and then adding water to form the composition. Any of the aforementioned additives, resins, plasticizers and pigments can be incorporated into the aqueous composition by using conventional techniques.

Typical amines that can be used are primary amines, secondary amines, tertiary amines, polyamines, and hydroxyamines, n-methylethanol amine, N,N-diethylethanolamine, N-aminoethanolamine, N-methyldiethanolamine, monoisopropanolamine, diisopropanolamine, triisopropanolamine, butanolamine, hexanolamine, methyl diethanolamine, N,N-diethylaminoethylamine, ethylene diamine, diethylene triamine, diethylene tetramine, hexamethylene tetramine, triethylamine and the like.

A primer composition can be used on the flexible substrate, particularly the flexible hydrocarbon rubber substrate, to improve adhesion of the thermosetting acrylic enamel to the substrate. Typical primers that can be used are of a hydroxyl terminated polyalkylene ether glycol cross-linked with an aromatic diisocyanate and a polyester chain-extended with an organic diisocyanate and cross-linked with an alkylated melamine formaldehyde resin.

Preferred primers of the above types are as follows: a hydroxyl terminated polypropylene ether glycol cross-linked with toluene diisocyanate and an isophthalate polyester chain-extended with methylene-bis-(cycloxyl isocyanate) and cross-linked with alkylated melamine formaldehyde resin.

Any of the aforementioned pigments and other additives can be added to the primers. Preferably, carbon black and extender pigments are used in the primer.

The flexible substrate may be a hydrocarbon rubber substrate of any one of the well-known or unsaturated hydrocarbon elastomers, i.e., those containing only carbon and hydrogen. It is preferred to use one of the ethylene-propylene copolymer elastomers, particularly one that is made sulfur curable by the inclusion of 1–10% by weight non-conjugated diene, because of their better resistance to oxidative and thermal aging; however, butyl rubber, styrene-butadiene rubber, polybutadiene rubber or polyisoprene rubber (either natural or synthetic) may also be used. Particularly preferred among the ethylene-propylene rubbers are those copolymers containing 50–75 weight per cent ethylene, 25–45 weight per cent propylene, and 2–8 weight per cent non-conjugated diene such as 1,4-hexadiene, 5-ethylidene-2-norbornene or dicyclopentadiene.

These hydrocarbon rubbers must be surface activated by one of the chemical, electrical or flame treatments which are known to activate hydrocarbon surfaces so that they are wet more easily by and adhere more tenaciously to the coatings applied thereon. Such treatments include surface oxidation by exposure of surface to oxidizing chemicals such as chromates, permanganates or ozone; etching by strong acid; exposure of the surface to electrical discharge or ionizing or non-ionizing radiation of various kinds or treatment with flame. A particularly preferred method of activation is the exposure of the surface to ultraviolet light in the presence of a photo-activator such as benzophenone.

Surface activation treatments of this type for the hydrocarbon rubber substrate may include the provision of thin layers of activating or coupling chemicals or resins. Photo-activators with ultraviolet light treatment as mentioned above can be used. Other activating or coupling chemicals that can be used include polymerizable ethylenically unsaturated monomers, polyisocyanates or isocyanate terminated polymers, epoxides or epoxide resins and polyethers.

One preferred process to provide an activated surface on ethylene-propylene-diene rubbers comprises:

1. cleaning the rubber surface with a solvent;
2. drying the surface;
3. applying a 5–10% benzophenone solution so that 1.0–2.0 milligrams of benzophenone per square inch will be deposited and then drying the surface;
4. exposing the surface to ultraviolet light, preferably a wave length band of 365 ± 5 nm and then applying a primer or the acrylic enamel topcoat.

Other flexible substrates to which the novel composition can be applied are themoplastic polyurethanes, for example, a thermoplastic polyurethane of an aromatic diisocyanate and a hydroxyl terminated polyester resin or a polyether resin, thermoplastic ethylene-propylene-diene rubbers, thermoplastic polyesters, microcellular polyurethanes, thermosetting polyesters and thermosetting polyurethanes.

To prepare the coated flexible substrate, the primer if used is applied by conventional techniques to the flexible substrate by the usual application methods such as spraying, electrostatic spraying, dipping, brushing, flow-coating and the like. The primer is then baked at 95° to 145°C. for 5 to 60 minutes. The novel aqueous thermosetting acrylic enamel is then applied by one of the aforementioned application methods and baked at 95° to 130°C. for 15 to 60 minutes.

The resulting cross-linked acrylic finish must be flexible and durable. The finish should have a tensile strength of 1000–2000 pounds per square inch and an elongation at break of about 50–110%. This is in contrast to a conventional cross-linked acrylic finish which has an elongation at break of 4–8%.

The following Examples illustrate the invention. All quantities are on a weight basis unless otherwise indicated.

EXAMPLE 1

A polymer solution is prepared as follows:

|  | Parts By Weight |
|---|---|
| Portion 1 | |
| Methylethyl ketone | 1300 |
| Portion 2 | |
| Methyl methacrylate monomer | 416 |
| Acrylic acid monomer | 48 |
| Butyl acrylate monomer | 975 |
| 2-Hydroxyethyl acrylate monomer | 160 |
| Azo-bis-isobutyronitrile | 16 |
| Portion 3 | |
| Methylethyl ketone | 300 |
| Total | 3215 |

Portion 1 is charged into a reaction vessel equipped with a stirrer, a reflux condenser, a thermometer and a heating mantle and heated to its reflux temperature of about 80°C. Portion 2 is premixed and added over a 90-minute period while maintaining the reaction mixture at its reflux temperature (80°C.). Portion 3 is then added and the reaction mixture is held at its reflux temperature for an additional 2 hours and then cooled to room temperature.

The resulting polymer solution has a polymer solids content of about 49%. The polymer is of methyl methacrylate/butylacrylate/2-hydroxyethyl acrylate/acrylic acid in a weight ratio of 26/61/10/3 and has a relative viscosity measured at 0.5% solids in methylethyl ketone at 25°C. of about 1.135 and an acid number of about 28–30.

A mill base is prepared as follows:

|  | Parts by Weight |
|---|---|
| Portion 1 | |
| Polymer solution (60% solids of a polymer of styrene/butyl acrylate/2-hydroxyethyl acrylate/acrylic acid weight ratio 50/38/8/4 in a blend of hydrocarbon solvents and xylene having a Gardner Holdt viscosity of X-Z measured at 25°C.) | 9.00 |
| Toluene | 4.50 |
| Anhydrous Isopropanol | 3.60 |
| V.M. & P. naphtha | 3.90 |
| Portion 2 | |
| Titanium dioxide pigment | 63.00 |
| Portion 3 | |
| Polymer solution (described above) | 16.00 |
| Total | 100.00 |

Portion 1 is charged into a high speed mixer and mixed for 30 minutes and then Portion 2 is added and mixed for an additional hour. Portion 3 is then added and mixed for 1 hour. The resulting composition is then passed through a conventional sand mill and ground at 20 gallons per minute in an 8 gallon unit to form a white pigment dispersion having a pigment to binder ratio of 413/100.

A coating composition is prepared by blending together the following ingredients:

|  | Parts By Weight |
|---|---|
| White Mill Base (prepared above) | 17.6 |
| Polymer solution (prepared above) | 71.9 |
| Butylated melamine formaldehyde resin solution (55.5% polymer solids in butanol having a Gardner Holdt viscosity of I-O measured at 25°C.) | 10.5 |

-continued

| | Parts By Weight |
|---|---|
| Total | 100.0 |

The resulting coating composition has 37 second viscosity measured in a No. 5 Zahn Cup at 25°C.

The physical properties of the above coating composition are tested using a standard sample which is baked for 30 minutes at 120°C. and are as follows:

| Tensile Strength | 1620 | pounds per square inch |
|---|---|---|
| Elongation at break | 60% | |

An aqueous coating composition is prepared as follows:

| | Parts By Weight |
|---|---|
| Coating Composition (prepared above) | 250 |
| Diethylethanol amine | 5 |
| Deionized water | 250 |
| Total | 505 |

The pigmented coating composition is charged into a mixing vessel and then the diethylethanol amine is added with mixing and mixing is continued for 5 minutes. Then the deionized water is slowly added over a 3 minute period with mixing to cause inversion and subsequently reduction to spray viscosity. The resulting aqueous coating composition is sprayed onto a surface treated with "Nordel" rubber substrate and dried under the following conditions:

air dried for 5 minutes and then
baked at 88°C for 30 minutes and then
baked at 135°C. for 30 minutes.

Before the "Nordel" rubber substrate is coated with the above composition, it is surface treated using the following procedure:

1. The rubber substrate is immersed in a 1.5% solution of Ridoline 72 manufactured by Amchem Products, Incorporated, Ambler, Pa.;
2. The substrate is rinsed as follows: Three 15 second rinses with the last rinse being with deionized water;
3. The substrate is drained and dried;
4. The dried substrate is sprayed with a 10% solution of benzophenone dissolved in xylene to deposit about 1.0–2.0 milligrams of dry benzophenone per square inch of surface of the substrate;
5. The benzophenone coated surface is exposed to a quartz-jacketed mercury vapor containing 0.05–0.4 joules/square centimeter of radiation in the wave length band of 365± 5nm and allowed to cool to about 50°C.

The resulting finish has an excellent appearance and a 60° gloss of 74. The finish has excellent resistance to cracking and chipping from the substrate when flexed and the finish has excellent weatherability.

A second set of surface treated "Nordel" rubber substrates are sprayed with a polyurethane primer having a 21% solids content and a pigment to binder ratio of 80/100 in which the binder is a hydroxyl terminated polypropylene ether glycol and a cross-linking agent of toluene diisocyanate and the pigment is a blend of carbon black and extender pigment. The primed substrates are baked for 30 minutes at 93°C. The above prepared coating composition is sprayed onto the primed substrate and baked as above. The resulting finish has good gloss and an excellent appearance and the finish has excellent resistance to cracking and chipping from the substrate even when the substrate is flexed and the finish has excellent weatherability and can withstand outdoor exposure to Florida sunlight for extended periods of time.

A third set of surface treated Nordel rubber substrates are sprayed with a polyurethane primer in which the primer has a solids content of 25–40% and a pigment to binder ratio of 30/100 in which the binder is an isophthalate polyester chain-extended with methylene bis(cyclohexylisocyanate) and uses an alkylated melamine formaldehyde as a cross-linking agent. The primed substrates are baked for 30 minutes at 120°C. The above prepared coating composition is sprayed onto the primed substrate and baked as above. The resulting finish has good gloss and an excellent appearance and the finish has excellent resistance to cracking and chipping from the substrate even when the substrate is flexed. The finish has excellent weatherability and can withstand outdoor exposure to Florida sunlight for extended periods of time.

EXAMPLE 2

A coating composition is prepared by blending together the following ingredients:

| | Parts By Weight |
|---|---|
| Aluminum Flake Paste (60% solids of Aluminum Flake in a conventional thinner) | 6.7 |
| Polymer Solution (prepared in Example 1) | 174.0 |
| Butylated Melamine Formaldehyde Resin Solution (described in Example 1) | 23.6 |
| Total | 204.3 |

The resulting coating composition is neutralized with diethanolamine and inverted into deionized water as in Example 1. The composition is sprayed onto a Nordel rubber substrate that is surface treated as in Example 1 and primed with a pigmented polyurethane primer of the polypropylene ether glycol cross-linked with toluene diisocyanate described in Example 1. The resulting finish has a good appearance and excellent adhesion to the flexible substrate and does not chip or crack when the substrate is flexed and has excellent outdoor durability.

The invention claimed is:

1. A flexible rubber substrate finished with 0.1–10 mil thick finish of a cross-linked thermosetting acrylic enamel; wherein the film-forming constituents of the enamel comprise:
   A. 70–95 percent by weight, based on the weight of the film-forming constituents, of an acrylic polymer consisting essentially of
      1. 19–44 percent by weight, based on the weight of the acrylic polymer, of an alkyl methacrylate having one to four carbon atoms in the alkyl group or styrene, or a mixture thereof;
      2. 50–75 percent by weight, based on the weight of the acrylic polymer, of an alkyl methacrylate having 6–12 carbon atoms in the alkyl group or an alkyl acrylate having 2–12 carbon atoms in the alkyl group or a mixture thereof;
3. 5–20 percent by weight, based on the weight of the acrylic polymer, of a hydroxy alkyl acrylate or a hydroxy alkyl methacrylate or a mixture thereof having two to four carbon atoms in the alkyl groups; and
4. 1 – 20 percent by weight, based on the weight of the acrylic polymer, of an $\alpha,\beta$-ethylenically unsaturated carboxylic acid; and B. 5 – 30 percent by weight, based on the weight of the film-forming constituents, of a compatible alkylated melamine formaldehyde having one to eight carbon atoms in the alkyl group;

wherein the flexible substrate comprises a surface activated thermoplastic polyurethane rubber.

2. The finished flexible substrate of claim 1, wherein the film-forming constituents of the enamel comprise:
A. 85–90 percent by weight, based on the weight of the film-forming constituents, of an acrylic polymer consisting essentially of
1. 20–32 percent by weight, based on the weight of the acrylic polymer, of methyl methacrylate;
2. 55–65 percent by weight, based on the weight of the acrylic polymer, of butyl acrylate;
3. 8–12 percent by weight, based on the weight of the acrylic polymer, of hydroxy ethyl acrylate; and
4. 1–5 percent by weight, based on the weight of the acrylic polymer of acrylic acid; and
B. 10–15 percent by weight, based on the weight of the film-forming constituents, of a butylated melamine formaldehyde resin.

3. The finished flexible substrate of claim 1, wherein the thermosetting acrylic enamel also contains 0.1–30 percent by weight, based on the weight of the enamel, of pigment.

4. The finished flexible substrate of claim 3, wherein the film-forming constituents of the enamel consist essentially of:
A. 85–90 percent by weight, based on the weight of the film-forming constituents, of an acrylic polymer consisting essentially of
1. 26 percent by weight, based on the weight of the acrylic polymer, of methyl methacrylate;
2. 61 percent by weight, based on the weight of the acrylic polymer, of butyl acrylate;
3. 10 percent by weight, based on the weight of the acrylic polymer, of hydroxy ethyl acrylate; and
4. 3 percent by weight, based on the weight of the acrylic polymer of acrylic acid; and
B. 10–15 percent by weight, based on the weight of the film-forming constituents, of a butylated melamine formaldehyde resin.

5. The finished flexible substrate of claim 4, wherein said substrate is a thermoplastic polyurethane of an aromatic diisocyanate and a hydroxyl-terminated polyester or a hydroxyl-terminated polyether.

* * * * *